(12) United States Patent
Gustafsson et al.

(10) Patent No.: US 8,445,599 B2
(45) Date of Patent: May 21, 2013

(54) MULTI-STAGE PROCESS FOR PRODUCING POLYETHYLENE WITH LOWERED GEL FORMATION

(75) Inventors: Bill Gustafsson, Stenungsund (SE); Jari Hatonen, Porvoo (FI); Petri Rekonen, Porvoo (FI); Markku Vahteri, Porvoo (FI); Siw Bodil Fredriksen, Skien (NO); Arild Follestad, Stathelle (NO); Karl Isak Skau, Tangenvelen (NO)

(73) Assignee: Borealis AG, Vienna (AT)

( * ) Notice: Subject to any disclaimer, the term of this patent is extended or adjusted under 35 U.S.C. 154(b) by 47 days.

(21) Appl. No.: 13/129,800

(22) PCT Filed: Oct. 16, 2009

(86) PCT No.: PCT/EP2009/007444
§ 371 (c)(1),
(2), (4) Date: Aug. 11, 2011

(87) PCT Pub. No.: WO2010/054732
PCT Pub. Date: May 20, 2010

(65) Prior Publication Data
US 2011/0288237 A1    Nov. 24, 2011

(30) Foreign Application Priority Data

Nov. 17, 2008  (EP) .................................... 08020023

(51) Int. Cl.
*C08L 23/00* (2006.01)
*C08F 2/00* (2006.01)
*C08F 4/00* (2006.01)
*C08F 210/00* (2006.01)
*C08F 110/02* (2006.01)

(52) U.S. Cl.
USPC ............... 525/240; 526/64; 526/90; 526/348; 526/352

(58) Field of Classification Search
USPC ........................ 525/240; 526/64, 90, 348, 352
See application file for complete search history.

(56) References Cited

FOREIGN PATENT DOCUMENTS

| EP | 1 655 339 A1 | * 5/2006 |
| EP | 1655339 A1 | 10/2006 |
| WO | 99/58584 | 11/1999 |

OTHER PUBLICATIONS

International Search Report and Written Opinion for PCT/EP2009/007444, Apr. 29, 2010.

* cited by examiner

*Primary Examiner* — William Cheung
(74) *Attorney, Agent, or Firm* — Milbank, Tweed, Hadley & McCloy LLP

(57) ABSTRACT

The present inventions relates to a process for producing polyethylene compositions comprising polymerizing polyethylene resins in a cascaded multi-stage reaction in which the reaction steps are performed in at least two slurry phase reactors (A) and (B) and at least one gas phase reactor (C) which are arranged in series in any order wherein in reactor (A) a low molecular weight ethylene homo- or copolymer fraction having a $MFR_2$ of 100 to 2000 g/10 min, in reactor (B) a low molecular weight ethylene homo- or copolymer fraction having an $MFR_2$ of 100 to 2000 g/10 min, and in reactor (C) a high molecular weight ethylene copolymer fraction are polymerized, and further comprising a compounding step after polymerization, wherein the final polyethylene composition has a $MFR_{21}$ of 3 to 50 g/10 min, the melt flow rates being determined according to ISO 1133.

16 Claims, No Drawings

MULTI-STAGE PROCESS FOR PRODUCING POLYETHYLENE WITH LOWERED GEL FORMATION

This application, filed under 35 U.S.C. §371, is based on International Application PCT/EP2009/007444 filed Oct. 16, 2009, which claims priority to European Patent Application No. 08020023.1, filed on Nov. 17, 2008, the disclosures of which are herein incorporated by reference in their entireties.

The present application relates to a multi-stage process for producing polyethylene resins in a reaction sequence with at least two slurry phase reactors and a gas phase reactor arranged in series. Further, the application is related to a multi-modal polymer composition comprising a polyethylene resin comprising two low molecular weight ethylene homo- or copolymer fractions having a $MFR_2$ of 100 to 2000 g/10 min and a high molecular weight ethylene copolymer fraction, the polyethylene resin having a $MFR_{21}$ of 3 to 50 g/10 min and showing a high homogeneity measured in a white spot test.

Generally, the strength properties of polyethylene compositions depend on their molecular weight. The higher the molecular weight is, the greater are elasticity, stiffness and creep properties. In certain applications like film, bottle, cable coating and pipe applications manufactured by extrusion or blow molding polyethylene compositions having a high molecular weight distribution combined with a narrow molecular weight distribution show bad flowing properties and a bad processability. Therefore, different approaches have been suggested for manufacturing polyethylene compositions with a broad molecular weight distribution.

One way of broadening the molecular weight distribution is to blend high and low molecular weight polyethylene fractions. However, by mechanical mixing it is difficult to get a product with sufficient homogeneity. By applying solution mixing, expensive equipment is needed so that these methods are either uneconomical or unsatisfactory.

Further, by choosing suitable polymerization catalysts the broadening of the molecular weight distribution is rather limited. Furthermore, even though some catalysts are capable of producing a broad molecular weight distribution, their ability to produce polyethylene resins having a good balance between mechanical properties and processability is limited because the catalysts usually cannot incorporate the comonomer(s) selectively into the polymer chains having the highest molecular weight.

Two stage processes for broadening the molecular weight distribution by using different hydrogen concentrations in the different stages are known in which in the first stage a polymer fraction is polymerized in the presence of a high hydrogen concentration and in the second stage in the presence of a low hydrogen concentration or vice versa. In the former case it is necessary to remove the unreacted gases and hydrogen after the first stage. In the latter case, the conventional Ziegler-Natta catalysts tend to loose their activity during the progress of polymerization already at the first stage. The rate of polymerization, which is initially high, decreases at the second reactor because of the lowered activity of the catalyst and of the high hydrogen concentration. As a consequence, the residence time in the second reactor becomes much longer than in the first stage. As a consequence a reactor of larger size has to be used in the second stage which leads to further difficulties in the control of the whole process. Furthermore, the comonomer that was used in the first polymerization stage needs to be removed from the reaction mixture so that it is not carried over to the subsequent polymerization stages.

Different polymerization methods can be used in multi-stage processes. Known multi-stage processes are for example slurry phase-slurry phase processes, gas phase-gas phase processes or slurry phase-gas phase processes. An example for slurry phase-slurry phase polymerization is described in EP 580 930 disclosing two sequential loop reactors. As examples for slurry phase-gas phase polymerization processes GB 1 532 231, U.S. Pat. No. 4,309,521, U.S. Pat. No. 4,368,304 and EP 517 868 are mentioned. The latter publication relates to a process for manufacturing a multimodal polyethylene resin having a bimodal and/or broad molecular weight distribution in a loop reactor and gas phase reactor arranged in series. In the first reactor stage ethylene, catalyst, cocatalyst, inert low boiling hydrocarbon and advantageously hydrogen is fed into a loop reactor for polymerizing a first polyethylene fraction, the residence time in the reactor being at least 10 minutes, at least an essential amount of reaction medium is separated and the polymer fraction is transferred to one or more gas phase reactors where the polymerization is completed in the presence of ethylene, optionally hydrogen and/or comonomer.

In EP 0 797 599 a three-stage polymerization process for producing multimodal polyethylene resins is disclosed in which bimodal polyethylene with a broad molecular weight distribution is produced in two loop reactors and a gas phase reactor connected in series. The first loop reactor refers to a pre-polymerization reactor in which a polyethylene in an amount of 1 to 20 wt % of the final polyethylene resin is produced.

The multi-stage processes disclosed in EP 517 868 and EP 0 797 599 produce polyethylene powders where the inhomogeneity is high for some special uses due to the residence time distribution of the catalyst particles in the loop reactors and the gas phase reactors, and this may adversely affect e.g the surface properties and other properties of the polymer composition.

When compounding multimodal polyethylene compositions e.g. for producing pipes, so-called "white spots" occur in the compounded material. These white spots usually have a size of below 10 to about 50 micrometer and consist of high molecular weight polymer particles that have not been adequately dispersed in the composition. Further, when compounding polymer compositions e.g. for the production of films gel particles with a size of about 0.01 to 1 mm often occur. These gel particles also consist of high molecular weight polymer particles not adequately dispersed and appear as disfiguring inhomogeneities in the finished film. Still further, inhomogeneities in multimodal polymer compositions may also increase roughness of the surface of articles produced thereof. As a side effect of the inherent inhomogeneity in the polyethylene powder particles operational problems in the gas phase reactor may occur, such as chunk and hot-spot formation.

As a measure for the homogeneity in multimodal resins the ISO 18553 test can be applied. ISO 18553 originally is a method for rating pigmented spots, i.e. serves to determine how well pigments are dispersed in a polymer. As the dispersion of the pigment is dependent on the overall homogeneity of the polymer because inhomogeneities of the polymer are not coloured by the pigment, ISO 18553 can also be used as a measure for the homogeneity of a polymer by counting the non-coloured white spots and rating them according to the ISO 18553.

It is hence object of the present application to provide a polymerization process which produces polyethylene resins with improved homogeneity resulting in improved gas phase reactor operation and lowered white spot and gel formation in the final polymer materials.

The present invention resides in the finding that polyethylene resins with white spot dispersion of less than 4.5 after a single compounding step can be produced by a cascaded multi-stage polymerization process in which at least two slurry phase reactors and at least one gas phase reactor are arranged in series. It has surprisingly been found that by using at least two loop reactors and at least one gas phase reactor arranged in series the homogeneity of the polymer is improved by means of improving the residence time distribution of the catalyst resulting in improved gas phase reactor operation conditions and in polyethylene resins with lower gel formation.

The present invention therefore relates to a process for producing polyethylene compositions comprising
polymerising polyethylene resins in a cascaded multi-stage reaction in which the reaction steps are performed in at least two slurry phase reactors (A) and (B) and at least one gas phase reactor (C) which are arranged in series in any order wherein
in reactor (A) a low molecular weight ethylene homo- or copolymer fraction having a $MFR_2$ of 100 to 2000 g/10 min, in reactor (B) a low molecular weight ethylene homo- or copolymer fraction having an $MFR_2$ of 100 to 2000 g/10 min, and
in reactor (C) a high molecular weight ethylene copolymer fraction are polymerised, and
further comprising a compounding step after polymerisation, wherein the final polyethylene composition has a $MFR_{21}$ of 3 to 50 g/10 min, the melt flow rates being determined according to ISO 1133.

Thus, the invention concerns a continuous process for preferably preparing multimodal ethylene copolymer compositions preferably in the presence of a suitable catalyst system in a multistage polymerisation reaction, which is comprising successive slurry phase and gas phase polymerisations followed by a compounding step. In a preferred embodiment the cascaded multistage reaction consists of two slurry phase reactors (A) and (B) and a gas phase reactor (C).

The cascaded multistage reaction may comprise more than 2 slurry phase reactors and 1 gas phase reactors. Due to economic considerations it is preferred at the moment that the upper limit of slurry phase reactors is 10 and of gas phase reactors is 5.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions of the composition consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

Preferably, the final polyethylene compositions produced by the inventive process are multimodal polyethylene compositions, more preferably bimodal polyethylene compositions.

As catalyst system any system of catalyst and optionally cocatalyst can be used suitable for polymerising polyethylene resins. Especially suitable are Ziegler-Natty and metallocene catalyst systems. In a preferred embodiment the polymerisation is carried out in the presence of a Ziegler-Natty catalyst. The catalyst system can be fed to any polymerisation stage but preferably is fed to the first polymerisation stage. Most preferably the catalyst system is only fed to the first polymerisation stage. The catalyst may be transferred into the polymerisation zone by any means known in the art. It is thus possible to suspend the catalyst in a diluent and maintain it as homogeneous slurry. Especially preferred is to use oil having a viscosity from 20 to 1500 mPa*s as diluent, as disclosed in WO-A-2006/063771. It is also possible to mix the catalyst with a viscous mixture of grease and oil and feed the resultant paste into the polymerisation zone. Still further, it is possible to let the catalyst settle and introduce portions of thus obtained catalyst mud into the polymerisation zone in a manner as disclosed, for instance, in EP-A-428 054.

The reactors in the cascaded multistage reaction can be arranged in any series whereby the third reaction step is preferably carried out in reactor (C). It is further preferred that the first reaction step is carried out in reactor (A). Further, the second reaction step is preferably carried out in reactor (B). In the most preferred embodiment a three step reaction sequence is arranged in the following series: The first reaction step is carried out in slurry phase reactor (A), the second reaction step is carried out in slurry phase reactor (B) and the third reaction step is carried out in gas phase reactor (C).

In slurry phase polymerisation the polymer particles formed in the polymerisation together with the catalyst fragmented and dispersed within the particles, are suspended in fluid hydrocarbon. The slurry phase is agitated to enable the transfer of reactants from the fluid into the particles.

The polymerisation in at least one of the slurry phase reactors (A) and (B), preferably in both reactors (A) and (B) usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps.

The ethylene content in the fluid phase of the slurry in at least one of the slurry phase reactors (A) and (B), preferably in both reactors (A) and (B) may be from 2 to 50% by mole, preferably from 3 to 20% by mole, and in particular from 5 to 15% by mole. The benefit of having a high ethylene concentration is that the productivity of the catalyst is increased but the drawback is that more ethylene then needs to be recycled than if the concentration was lower.

The temperature in the slurry phase polymerisation in at least one of the slurry phase reactors (A) and (B), preferably in both reactors (A) and (B) is typically from 50 to 115° C., preferably from 60 to 110° C. and in particular from 70 to 100° C. The pressure is typically from 1 to 150 bar, preferably from 1 to 100 bar in at least one of the reactors (A) and (B), preferably in both reactors (A) and (B).

The slurry phase polymerisation in at least one of the slurry phase reactors (A) and (B), preferably in both reactors (A) and (B) may be conducted in any known reactor used for slurry phase polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479 186 and U.S. Pat. No. 5,391,654.

It is sometimes advantageous to conduct the slurry phase polymerisation above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment at least one polymerization step, preferably all polymerization steps in the slurry phase reactors (A) and (B), are carried out under supercritical conditions whereby the reaction temperature and reaction pressure are above equivalent critical points of the mixture formed by hydrocarbon medium, monomer, hydrogen and optional comonomer and the polymerization temperature is lower than the melting temperature of the polymer formed.

It is preferred that the temperature and the pressure of the reaction in the slurry phase reactors (A) and (B), differ by not more than 10%, preferably from 0% to 9%.

The slurry may be withdrawn from at least one of the slurry phase reactors, preferably all slurry phase reactors either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. No. 3,374,211, U.S. Pat. No. 3,242,150 and EP-A-1 310 295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

In reactor (A) a polyethylene fraction with a $MFR_2$ of 100 to 2000 g/10 min, preferably 200 to 1000 g/10 min, most preferably 300 to 800 g/10 min is polymerised.

For adjusting the $MFR_2$ of the polyethylene fraction polymerised in reactor (A) preferably hydrogen is introduced into the reactor. The hydrogen feed is preferably adjusted to the ethylene feed in order to fulfil a hydrogen to ethylene ratio in reactor (A) of 250 to 1000 mol/kmol, more preferably of 500 to 800 mol/kmol.

In reactor (B) a polyethylene fraction with a $MFR_2$ of 100 to 2000 g/10 min, preferably 150 to 1000 g/10 min, most preferably 200 to 600 g/10 min is polymerised.

For adjusting the $MFR_2$ of the polyethylene fraction polymerised in reactor (B) preferably hydrogen is introduced into the reactor. The hydrogen feed is preferably adjusted to the ethylene feed in order to fulfil a hydrogen to ethylene ratio in reactor (B) of 250 to 1000 mol/kmol, more preferably of 500 to 800 mol/kmol, It is preferred that the relation of the melt flow rates of the ethylene homo- or copolymer fractions produced in reactors (A) and (B) are within the following range:

$$0.1 \leq (MFR_2(A)/MFR_2(B)) \leq 10.$$

More preferably the melt flow rates of the ethylene homo- or copolymer fractions produced in reactors (A) and (B) are within the following range:

$$0.5 \leq (MFR_2(A)/MFR_2(B)) \leq 5.$$

The polyethylene fraction produced in reactor (A) can be an ethylene homo- or copolymer fraction. If polymerising a copolymer comonomers preferably are selected from the group comprising 1-butene, 1-hexene, 4-methyl-1-pentene, 1-octene or their mixtures. In a preferred embodiment in reactor (A) an ethylene homopolymer is polymerised so that no comonomer is fed to this reaction stage.

The residence time and the polymerisation temperature in reactor (A) are adjusted as such as to polymerise an ethylene homo- or copolymer fraction typically in an amount of 10 to 30 wt %, preferably 15 to 25 wt % of the total polyethylene resin.

In a preferred embodiment the polymer fraction produced in slurry phase reactor (A) is transferred to slurry phase reactor (B).

Also the polyethylene fraction produced in reactor (B) can be an ethylene homo- or copolymer fraction. If polymerising a copolymer comonomers preferably are selected from the group comprising 1-butene, 1-hexene, 4-methyl-1-pentene, 1-octene or their mixtures. The comonomer selected in the reactor stages (A) and (B) can be the same or different. In a preferred embodiment in reactor (B) an ethylene homopolymer is polymerised so that no comonomer is fed to this reaction stage.

In reactor (B) the residence time and the polymerisation temperature are adjusted as such as to polymerise an ethylene homo- or copolymer fraction typically in an amount of 15 to 40 wt %, preferably 20 to 35 wt % of the total polyethylene resin.

In comparison to the multistage processes disclosed in EP 517 868 and EP 0 797 599 the single slurry phase polymerization stage producing up to 50 wt % of the total polyethylene is split in at least two different slurry phase polymerisation stages in which preferably a combined amount of low molecular weight ethylene homo- or copolymer of at least 53 wt %, more preferably of at least 55 wt % but preferably not more than 70 wt %, more preferably not more than 65 wt % of the total polyethylene resin is polymerized. This split causes an improved residence time of catalyst particles in the slurry phase stages surprisingly results in an improved homogeneity of the final polyethylene product.

The polymer fraction produced in the sequential slurry phase reactors preferably is transferred to the at least one gas phase reactor (C).

In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of a fluidisation gas comprising the olefin monomer, eventually comonomer(s), eventually chain growth controllers or chain transfer agents, such as hydrogen, and eventually inert gas. The inert gas can thereby be the same or different as the inert gas used in the slurry phase reactors (A) or (B). The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e, g. U.S. Pat. No. 4,933,149 and EP-A-684 871.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087261. Other types of fluidisation grids are disclosed, amongst others, in U.S. Pat. No. 4,578,879, EP 600 414 and EP-A-721 798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher than the minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practice. An overview is given, amongst others, in Geldart: Gas Fluidisation Technology, J. Wiley & Sons, 1996.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is then removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

After that the gas is cooled in a heat exchanger to remove the reaction heat. The gas is cooled to a temperature which is lower than that of the bed to prevent the bed from being heated because of the reaction. It is possible to cool the gas to a temperature where a part of it condenses. When the liquid droplets enter the reaction zone they are vaporized. The vaporisation heat then contributes to the removal of the reaction heat. This kind of operation is called condensed mode and variations of it are disclosed, amongst others, in WO-A-2007/025640, U.S. Pat. No. 4,543,399, EP-A-699 213, and WO-A-94/25495. It is also possible to add condensing agents into the recycle gas stream, as disclosed in EP-A-696 293. The condensing agents are non-polymerisable components, such as propane, n-pentane, isopentane, n-butane or isobutane, which are at least partially condensed in the cooler.

The polymeric product may be withdrawn from the gas phase reactor either continuously or intermittently. Combinations of these methods may also be used. Continuous withdrawal is disclosed, amongst others, in WO-A-00/29452. Intermittent withdrawal is disclosed, amongst others, in U.S. Pat. No. 4,621,952, EP-A-188 125, EP-A-250 169 and EP-A-579 426.

The top part of the at least one gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed levels.

Also antistatic agent(s) may be introduced into the at least one gas phase reactor if needed. Suitable antistatic agents and methods to use them are disclosed, amongst others, in U.S. Pat. No. 5,026,795, U.S. Pat. No. 4,803,251, U.S. Pat. No. 4,532,311, U.S. Pat. No. 4,855,370 and EP-A-560 035. They are usually polar compounds and include, amongst others, water, ketones, aldehydes alcohols.

The reactor may include a mechanical agitator to further facilitate mixing within the fluidised bed. An example of suitable agitator design is given in EP-A-707 513.

The temperature in the gas phase polymerisation in reactor (C) typically is at least 70° C., preferably at least 80° C. The temperature typically is not more than 105° C., preferably not more than 95° C. The pressure is typically at least 10 bar, preferably at least 15 bar but typically not more than 30 bar, preferably not more than 25 bar.

In reactor (C) the polymerisation conditions are selected as such that the final polyethylene resin preferably has a $MFR_5$ of 0.05 to 2 g/10 min, more preferably 0.1 to 1.5 g/10 min, most preferably 0.2 to 1 g/10 min.

Further, final polyethylene composition has a $MFR_{21}$ of 3 to 50 g/10 min, preferably 5 to 30 g/10 min, most preferably 7 to 25 g/10 min.

For adjusting the melt flow rate of the polyethylene fraction polymerised in reactor (C) hydrogen may be introduced into the reactor. The hydrogen feed is preferably adjusted to the ethylene feed in order to fulfil a hydrogen to ethylene ratio in reactor (A) of 0 to 60 mol/kmol, more preferably of 10 to 40 mol/kmol.

In gas phase reactor (C) an ethylene copolymer fraction is produced. The fluidisation gas stream thus comprises comonomers preferably selected from the group comprising $C_4$ to $C_8$ alpha-olefins, such as 1-butene, 1 hexene, 4-methyl-1-pentene, 1-octene or their mixtures. Most preferably 1-hexene is used as comononer. The comonomer used in reactor (C) may be the same or different than that used in slurry phase reactors (A) and/or (B). The comonomer feed is preferably adjusted to the ethylene feed in order to fulfil a comonomer to ethylene ratio of at least 100 mol/kmol, more preferably 5 to 50 mol/kmol, most preferably 10 to 40 mol/kmol.

The residence time and the polymerisation temperature in reactor (C) are adjusted as such as to polymerise an ethylene copolymer fraction typically in an amount of 30 to 75 wt %, preferably 35 to 60 wt % of the total polyethylene resin.

In a preferred embodiment the process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutene, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 70° C. and more preferably from 30° C. to 60° C.

The pressure is not critical and is typically from 1 bar to 150 bar, preferably from 10 bar to 100 bar.

The amount of monomer is typically such that from 0.1 grams to 1000 grams of monomer per one gram solid catalyst component is polymerised in the pre-polymerisation step. As the person skilled in the art knows, the catalyst particles recovered from a continuous pre-polymerisation reactor do not all contain the same amount of pre-polymer. Instead, each particle has its own characteristic amount which depends on the residence time of that particle in the pre-polymerisation reactor. As some particles remain in the reactor for a relatively long time and some for a relatively short time, then also the amount of pre-polymer on different particles is different and some individual particles may contain an amount of pre-polymer which is outside the above limits. However, the average amount of pre-polymer on the catalyst typically is within the limits specified above.

In addition to ethylene monomer it is possible to use one or more alpha-olefin comonomers in the pre-polymerisation step if desired. Suitable comonomers are, for example, 1-butene, 1-hexene, 4-methyl-1-pentene, 1-octene and their mixtures.

The molecular weight of the pre-polymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the pre-polymerisation step. However, where the solid catalyst component and the cocatalyst can be fed separately it is possible that only a part of cocatalyst is introduced into the pre-polymerisation stage and the remaining part into the subsequent polymerisation stages. Also in such cases it is necessary to introduce as much cocatalyst into the pre-polymerisation stage as necessary to obtain a sufficient polymerisation reaction.

The polyethylene resins produced according to the inventive polymerisation process show an improved homogeneity. After a single compounding step with a pigment, such as e.g. carbon black, the white spots dispersed in the final polyethylene composition preferably have a homogeneity, expressed as the white spot dispersion, of less than 4.5, more preferably 0.1 to 4.0, most preferably 0.1 to 3.5, determined according to ISO 18553.

Another aspect of the present invention relates to a multimodal polymer composition comprising a polyethylene resin comprising (i) a first low molecular weight ethylene homo- or copolymer fraction having a $MFR_2$ of 100 to 2000 g/10 min, (ii) a second low molecular weight ethylene homo- or copolymer fraction having a $MFR_2$ of 100 to 2000 g/10 min, and (iii) a high molecular weight ethylene copolymer fraction, wherein the polyethylene resin has a $MFR_{21}$ of 3 to 50 g/10 min and white spots are dispersed within the final composition with a white spot dispersion of less than 4.5 after a single compounding step, the melt flow rate being determined according to ISO 1133 and the white spot test according to ISO 18553.

In a preferred embodiment, the multimodal polymer composition is produced by the process as described above.

The multimodal polymer composition may comprise more polymer fractions than polyethylene fractions (i), (ii) and (iii). However, in a preferred embodiment the multimodal polymer composition of the invention comprises a polyethylene resin consisting of the polyethylene fractions (i), (ii) and (iii).

The polyethylene fraction (i) may consist of single ethylene polymer fraction but may also comprise a mixture of different ethylene polymer fractions. This also applies for polyethylene fraction (ii) and (iii).

Typically the ratio of the melt flow rates of the polyethylene fractions (i) and (ii) are within the following range:

$$0.1 \leq (MFR_2(i)/MFR_2(ii)) \leq 10,$$

more preferably in the following range:

$$0.5 \leq (MFR_2(i)/MFR_2(ii)) \leq 5.$$

Polyethylene fraction (i) is typically present in an amount of 10 to 30 wt %, preferably in an amount of 15 to 25 wt % of the total polyethylene resin.

Further, polyethylene fraction (i) has a $MFR_2$ of 100 to 2000 g/10 min, preferably a $MFR_2$ of 200 to 1000 g/10 min, more preferably a $MFR_2$ of 300 to 800 g/10 min.

The $MFR_2$ (2.16 kg, 190° C.) for polyethylene is determined according to ISO 1133. Melt flow rate and average molecular weight are inversely related to each other, i.e. a higher melt flow rate is equivalent to a lower average molecular weight and vice versa. Further, the higher the melt flow rate, the lower the viscosity of the polymeric material.

It is further preferred that polyethylene fraction (i) has a weight average molecular weight $M_w$ of 5,000 to 70,000 g/mol, more preferably 10,000 to 50,000 g/mol, most preferably 15,000 to 35,000 g/mol, and a number average molecular weight $M_n$ of 500 to 15,000 g/mol, more preferably of 1,000 to 10,000 g/mol, most preferably of 1,5000 to 5,000 g/mol, determined by GPC according to ISO 16014-1, and 4.

Preferably, polyethylene fraction (i) has a molecular weight distribution MWD of 2 to 12, more preferably 3 to 10, most preferably 4 to 8. Thereby, the MWD is determined as $M_w/M_n$.

The density of polyethylene fraction (i) preferably is 945 to 978 kg/m³, more preferably 950 to 978 kg/m³, determined according to ISO 1183.

Polyethylene fraction (i) can be a homo- or a copolymer. In case of a copolymer, ethylene is preferably polymerised in the presence of at least one comonomer selected from the group comprising 1-butene, 1-hexene, 4-methyl-1-pentene, 1-octene or their mixtures. In a preferred embodiment polyethylene fraction (i) is an ethylene homopolymer fraction.

Polyethylene fraction (ii) is typically present in an amount of 15 to 40 wt %, preferably in an amount of 20 to 35 wt % of the total polyethylene resin.

Further, polyethylene fraction (ii) has a $MFR_2$ of 100 to 2000 g/10 min, preferably a $MFR_2$ of 150 to 1000 g/10 min, more preferably a $MFR_2$ of 200 to 600 g/10 min.

It is further preferred that polyethylene fraction (ii) has a weight average molecular weight $M_w$ of 5,000 to 70,000 g/mol, more preferably 10,000 to 50,000 g/mol, most preferably 15,000 to 35,000 g/mol, and a number average molecular weight $M_n$ of 500 to 15,000 g/mol, more preferably of 1,000 to 10,000 g/mol, most preferably of 1,5000 to 5,000 g/mol, determined by GPC according to ISO 16014-1, and -4.

Preferably, polyethylene fraction (ii) has a molecular weight distribution MWD (as $M_w/M_n$) of 2 to 12, more preferably 3 to 10, most preferably 4 to 8.

The density of polyethylene fraction (ii) preferably is 945 to 978 kg/m$^3$, more preferably 950 to 978 kg/m$^3$, determined according to ISO 1183.

Polyethylene fraction (ii) can be a homo- or a copolymer. In case of a copolymer, ethylene is preferably polymerised in the presence of at least one comonomer selected from the group comprising 1-butene, 1-hexene, 4-methyl-1-pentene, 1-octene or their mixtures. The at least one comonomer selected for polymerising polyethylene fractions (i) and (ii) can be the same or different. In a preferred embodiment polyethylene fraction (ii) is an ethylene homopolymer fraction.

Polyethylene fraction (iii) is typically present in an amount of 30 to 75 wt %, preferably in an amount of 35 to 60 wt % of the total polyethylene resin. In a preferred embodiment polyethylene fraction (iii) is present in an amount of 30 to 47 wt %, more preferably in an amount of 25 to 45 wt % of the total polyethylene resin.

The density of polyethylene fraction (iii) preferably is 895 to 935 kg/m$^3$, more preferably 905 to 930, determined according to ISO 1183.

It is further preferred that polyethylene fraction (iii) has a weight average molecular weight $M_w$ of 100,000 to 800,000 g/mol, more preferably 150,000 to 600,000 g/mol, most preferably 200,000 to 600,000 g/mol, and a number average molecular weight $M_n$ of 10,000 to 200,000 g/mol, more preferably of 20,000 to 150,000 g/mol, determined by GPC according to ISO 16014-1, and -4.

Preferably, polyethylene fraction (iii) has a molecular weight distribution MWD (as $M_w/M_n$) of 2 to 12, more preferably 3 to 10, most preferably 4 to 8.

Polyethylene fraction (iii) refers to a copolymer, whereby ethylene is typically polymerised in the presence of at least one comonomer selected from the group comprising $C_4$ to $C_8$ alpha-olefins, preferably selected from the group comprising 1-butene, 1-hexene, 4-methyl-1-pentene, 1-octene or their mixtures. Mostly preferred is 1-hexene.

In a preferred embodiment combined polyethylene fractions (i) and (ii) are present in an amount of at least 53 wt %, more preferably in an amount of at least 55 wt % of the total polyethylene resin.

The comonomer content in polyethylene fraction (iii) is preferably in the range of 0.1 to 10 wt %, more preferably 0.2 to 7.5 wt %, most preferably 0.5 to 5 wt %.

The polyethylene resin has a $MFR_{21}$ of 3 to 50 g/10 min, preferably a $MFR_{21}$ of 5 to 30 g/10 min, most preferably a $MFR_{21}$ of 7 to 25 g/10 min.

Further, the polyethylene resin preferably has a $MFR_5$ of 0.05 to 2 g/10 min, more preferably a $MFR_5$ of 0.1 to 1.5 g/10 min, most preferably a $MFR_5$ of 0.2 to 1 g/10 min.

It is preferred that the polyethylene resin refers to a multimodal polyethylene resin, more preferably a bimodal or a trimodal polyethylene resin.

The density of polyethylene resin preferably is 940 to 970 kg/m$^3$, more preferably 945 to 960 kg/m$^3$, determined according to ISO 1183.

The polyethylene resin may be produced by any suitable process as known in the art in the presence of any suitable catalyst known in the art. However, it is preferred that the polyethylene is produced by a multi-stage process, most preferably by the cascaded multi-stage process of the present invention.

The polymer composition of the present invention may further contain various additives, such as miscible thermoplastics, antioxidants, UV-stabilizers, process-stabilizers, lubricants, demolding agents, nucleating agents, acid scavengers, fillers, colouring agents and foaming agents, which can be added to the composition before, during or after the compounding in an amount of not more than 10 wt %, preferably not more than 7 wt % of the total composition.

In a preferred embodiment carbon black is added to the composition in an amount of up to 4 wt %, more preferably in an amount of up to 3.5 wt % of the total composition. The carbon black can be added to the composition by any suitable means, preferably in form of a master batch including carbon black in an amount of more than 10 wt % of that master batch.

The composition of the invention is preferably produced in a process comprising a compounding step, wherein the polyethylene resin, i.e. the blend which is typically obtained as a powder from the reactor, is extruded in an extruder and then pelletised to polymer pellets in a manner known in the art.

The process of the invention comprises such a compounding step.

Optionally, additives or other polymer components can be added to the composition before or during the compounding step in the amount as described above. Preferably, the composition of the invention obtained from the reactor is compounded in the extruder together with additives in a manner known in the art.

The extruder may be e.g. any conventionally used extruder, preferably in a twin screw extruder. One example of suitable twin screw extruders for the present compounding step is a co-rotating twin screw extruder. Those are manufactured, amongst others, by Coperion or Japan Steel Works. Another example is a counter rotating twin screw extruder. Such extruders are manufactured, amongst others, by Kobe Steel or Japan Steel Works.

The extruders typically include a melting section where the polymer is melted and a mixing section where the polymer melt is homogenised. Melting and homogenisation are achieved by introducing energy into the polymer. The more energy is introduced into the polymer the better the homogenisation effect achieved. However, too high energy incorporation causes the polymer to degrade and the mechanical properties to deteriorate. Suitable level of specific energy input (SEI) is from 150 to 350 kWh/ton polymer, preferably 150 to 250 kWh/ton polymer, most preferably 170 to 200 kWh/ton polymer.

Typical average residence time of the polymer in the extruder is from 30 seconds to 10 minutes. This figure depends to some extent on the type of the extruder. However, for most extruders values from 1 minute to 5 minutes result in a good combination of homogeneity and mechanical properties of the polymer composition.

Suitable extrusion methods are disclosed, amongst others, in EP-A-1 600 276 and WO-A-98/15591.

The compounding step can be preferably effected with a feed of 5 to 100 tons/h, preferably 10 to 50 tons/h.

The screw speed of the extruder thereby is suitably not higher than 500 rpm, preferably within the range of 200 to 500 rpm, more preferably 300 to 450 rpm, most preferably 325 to 400 rpm.

It is known that the temperature of the polymer melt may vary in the extruder, the highest (max) melt temperature of the composition in the extruder during the extrusion is typically more than 150° C., preferably in the range of 220 to 350° C., most preferably in the range of 220 to 250° C.

The benefit of the invention is that an excellent homogeneity can be obtained without extensive mixing, already by effecting once the compounding step, e.g. the preferably extrusion with production rates as defined above, and additionally, together with the high level homogeneity desirable polymer properties can be achieved/maintained.

Furthermore, preferably, also the pellets obtained from that single compounding step have the above defined homogeneity levels.

The determination of the homogeneity is preferably conducted from a coloured sample of these pellets by using the white spot area and/or white spot rating test method of ISO 18553 as disclosed in WO 2006/048260. Thereby the coloured sample is obtained by effecting the above described compounding step of the polyethylene resin powder in the presence of a pigment, e.g. carbon black. If desired, other additives can also be used in said samples according to the conventional practice in the white sport determination. The polymer compositions of the invention thereby show a homogeneity, expressed as the ISO-rating of the white spots, of less than 4.5, more preferably 0.1 to 4.0, most preferably 0.1 to 3.5.

Additionally the carbon black dispersion in the final composition is typically less than 1.5, more preferably in the range of 0 to 1.1, also determined according to ISO 18553.

Accordingly, the polymer composition of the invention can be used in many end applications, i.a. producing articles preferably extruded articles such as pipes or films, like blown films or cast films, or moulded articles, including injection moulded articles and blow moulded articles such as bottles or barrels. The invention provides said use and the obtained articles comprising the polymer of the invention.

The invention is especially useful in cases where the combined low molecular weight component (component (i) and (ii)) form a major part of the multimodal composition, for instance where the combined amount of components (i) and (ii) forms at least 53 wt %, preferably at least 55 wt % of the total polyethylene resin. The upper limit of the combined amount of the components (i) and (ii) is preferably 70 wt %, more preferably 65 wt %.

The present invention thus further relates to the use of at least two slurry phase reactors for the polymerisation of a low molecular weight polyethylene fraction, which preferably forms at least 53 wt %, more preferably at least 55 wt % of the total polyethylene resin for improving the homogeneity of a multimodal polyethylene resin.

The present invention is further characterised by means of the following examples.

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature 190° C. and a load of 5 kg, the $MFR_2$ of polyethylene at a temperature 190° C. and a load of 2.16 kg and the $MFR_{21}$ of polyethylene is measured at a temperature of 190° C. and a load of 21.6 kg.

b) Density

The density is measured according to ISO 1183 on compression molded specimens.

c) Measure of Homogeneity

The white spot area of the once compounded composition is determined following ISO 18 553 as follows:

A sample of the composition (including a pigment to make the inhomogeneities visible, e.g. carbon black in an amount as listed in Table 2 below) which is obtained after a single compounding step as listed in Table 1 below, is analysed by firstly obtaining 6 microtome cuts of 6 different parts of the sample (thickness<60 micrometer, diameter 3 to 5 mm).

The cuts are evaluated at a magnification of 100, and the size, i.e. the part of the surface, of the non-coloured inclusions ("white-spots", agglomerates, particles) on a total surface of each cut of 0.7 $mm^2$ is determined. All white spots with a diameter>5 micrometer are counted. The "white spot area" is then expressed as the averaged fraction of the white spots on the total surface of the sample cut.

In addition to the white spot area test, homogeneity complementary is determined to the modified ISO 18553 white spot rating test. In this test, inhomogeneities of the composition present after a single compounding step as described above, which appear as white spots, are determined and rated according to the rating scheme given in ISO 18553. The lower the composition is rated in this test the better is the homogeneity of the composition.

The carbon black dispersion is also determined according to ISO 18553.

2. Materials a) Inventive Examples (Ex 1 to Ex 4)

Into a first loop reactor having a volume of 50 $dm^3$ and operating at a temperature of 95° C. and a pressure of 61.5 bar propane (C3), ethylene (C2), and hydrogen ($H_2$) were introduced at feed rates as listed in Table 1. Lynx 200 as catalyst, supplied by BASF and triethylaluminum as cocatalyst were added so that the ratio of Al/Ti was 30 mol/mol. The production rate, production split and melt index of the polymer fraction for each example Ex 1 to Ex 4 produced in the first loop reactor are listed in Table 1. The slurry was withdrawn intermittently from the first loop reactor and directed to a second loop reactor having a volume of 500 $dm^3$ and operating at a temperature of 95° C. and a pressure of 56.5 bar. Additionally, propane, ethylene, and hydrogen were fed to the second loop reactor whereby the ethylene concentration and the hydrogen to ethylene ratio for each example Ex 1 to Ex 4 are listed in Table 1. The production rate, production split and melt index of the polymer fractions produced in the second loop reactor are listed in Table 1. The slurry was withdrawn intermittently from the second loop reactor by using settling legs and directed to a gas phase reactor. The gas phase reactor was operated at a temperature of 85° C. and a pressure of 20 bar. Additional ethylene, 1-hexene comonomer, and hydrogen were fed whereby the ethylene concentration, the 1-hexene to ethylene ratio and the hydrogen to ethylene ratio as well as the production rate, production split, the melt flow rate and the density of the polymers of each example Ex 1 to Ex 4 withdrawn from the gas phase reactor are listed in Table 1.

b) Comparative Examples CE 1 and CE 2

For Comparative Examples CE 1 and CE 2 ethylene, propane, and hydrogen were fed into the second loop reactor under the conditions above together with the Lynx 200 catalyst and triethylaluminum cocatalyst so that the ratio of Al/Ti was 30 mol/mol. The ethylene concentration and the hydrogen to ethylene ratio as well as production rate, production split and melt index of the polymer fractions of CE 1 and CE 2 produced in the second loop reactor are listed in Table 1. The slurry was withdrawn intermittently from the second loop reactor by using settling legs and directed to a gas phase reactor. The gas phase reactor was operated at the above conditions. Additional ethylene, 1 hexene comonomer, and hydrogen were fed whereby the ethylene concentration, the 1-hexene to ethylene ratio and the hydrogen to ethylene ratio as well as the production rate, production split, the melt flow rate and the density of the polymers of each example CE 1 and CE 2 withdrawn from the gas phase reactor are listed in Table 1.

c) Comparative Examples CE 3 and CE 4

For Comparative Examples CE 3 and CE 4 ethylene, propane, and hydrogen were fed together with the Lynx 200 catalyst and triethylaluminum cocatalyst so that the ratio of Al/Ti was 30 mol/mol into the first loop reactor which is used as pre-polymerisation reactor under the conditions above. The production rate, production split and melt index of the polymer fraction for examples CE 3 and CE 4 produced in the first loop reactor are listed in Table 1. The slurry was withdrawn intermittently from the first loop reactor and directed to the above second loop reactor operating under the above conditions. The ethylene concentration and the hydrogen to ethylene ratio as well as production rate, production split and melt index of the polymer fractions of CE 1 and CE 2 produced in the second loop reactor are listed in Table 1. The slurry was withdrawn intermittently from the second loop reactor by using settling legs and directed to a gas phase reactor. The gas phase reactor was operated at the above conditions. Additional ethylene, 1-hexene comonomer, and hydrogen were fed whereby the ethylene concentration, the 1-hexene to ethylene ratio and the hydrogen to ethylene ratio as well as the production rate, production split, the melt flow rate and the density of the polymers of each example CE 3 and CE 4 withdrawn from the gas phase reactor are listed in Table 1.

d) Compounding

The polymer powders of each example Ex 1 to Ex 4 and CE 1 to CE 4 were mixed with 2200 ppm Irganox B225, supplied by Ciba Specialty Chemicals, 1500 ppm Calcium-stearate, CAS-No. 1592-23-0, and 5.75 wt % carbon black containing masterbatch HE0880. The mixture was then compounded using the CIM90P extruder manufactured by Japan Steel Works. Feed, screw speed, SEI and melt temperature are listed in Table 1.

TABLE 1

Process data for inventive Examples Ex 1 to Ex 4 and Comparative Examples CE 1 to CE 4

| | Ex 1 | Ex 2 | Ex 3 | Ex 4 | CE 1 | CE 2 | CE 3 | CE 4 |
|---|---|---|---|---|---|---|---|---|
| First loop reactor: | | | | | | | | |
| C3 feed [kg/h] | 41 | 41 | 42 | 42 | — | — | 43 | 43 |
| C2 feed [kg/h] | 7.0 | 7.0 | 9.0 | 9.0 | — | — | 2.0 | 2.0 |
| H$_2$ feed [g/h] | 26 | 32 | 45 | 45 | — | — | 4.9 | 5.1 |
| Prod. rate [kg/h] | 6.6 | 6.7 | 8.6 | 8.5 | — | — | 1.9 | 1.9 |
| Split [%] | 15 | 15 | 18 | 18 | — | — | 3 | 3 |
| MFR$_2$ [g/10 min] | 660 | 710 | 550 | 500 | — | — | 15 | 15 |
| Second loop reactor: | | | | | | | | |
| C2 [mol %] | 3 | 3 | 3 | 3 | 3 | 3 | 3 | 3 |
| H$_2$/C2 [mol/kmol] | 642 | 652 | 658 | 666 | 680 | 735 | 701 | 795 |
| Prod. rate [kg/h] | 15.8 | 15.4 | 17.3 | 17.4 | 28.4 | 24.2 | 24.5 | 27.2 |
| Split [%] | 35 | 35 | 38 | 37 | 57 | 50 | 51 | 52 |
| MFR$_2$ [g/10 min] | 464 | 552 | 535 | 464 | 574 | 568 | 373 | 782 |
| Gas phase reactor: | | | | | | | | |
| C2 [mol %] | 11 | 12 | 9.6 | 8 | 8 | 13 | 9 | 7 |
| H$_2$/C2 [mol/kmol] | 37 | 39 | 18 | 10 | 6 | 19 | 9 | 10 |
| C6/C2 [mol/kmol] | 21 | 21 | 37 | 34 | 30 | 12 | 18 | 18 |
| Prod. rate [kg/h] | 23.4 | 21.6 | 20.5 | 20.8 | 21.2 | 24.5 | 21.3 | 23 |
| Split [%] | 51 | 50 | 44 | 45 | 43 | 50 | 45 | 44 |
| MFR$_5$ [g/10 min] | 0.23 | 0.26 | 0.40 | 0.30 | 0.32 | 0.11 | 0.18 | 0.23 |
| Density [kg/m$^3$] | 955 | 955 | 954 | 955 | 956 | 956 | 955 | 956 |
| Compounding: | | | | | | | | |
| Feed [kg/h] | 225 | 220 | 220 | 204 | 194 | 191 | 191 | 191 |
| Screw Speed [rpm] | 350 | 350 | 250 | 350 | 349 | 418 | 418 | 418 |
| SEI [kWh/ton] | 184 | 173 | 176 | 183 | 165 | 215 | 215 | 215 |
| Melt temperature [° C.] | 240 | 238 | 225 | 240 | 237 | 226 | 226 | 226 |

From the compounded polymer compositions of inventive Examples Ex 1 to Ex 4 and comparative Examples CE 1 to CE 4 material properties are measured which are listed in Table 2.

TABLE 2

| | Material Properties | | | | | | | |
|---|---|---|---|---|---|---|---|---|
| | Ex 1 | Ex 2 | Ex 3 | Ex 4 | CE 1 | CE 2 | CE 3 | CE 4 |
| MFR$_5$ [g/10 min] | 0.22 | 0.26 | 0.35 | 0.31 | 0.29 | 0.11 | 0.16 | 0.19 |
| Density [kg/m$^3$] | 966 | 967 | 963 | 971 | 969 | 967 | 966 | 967 |
| CB amount [%] | 2.1 | 2.2 | 1.6 | 3.5 | 2.8 | 2.3 | 2.1 | 2.1 |
| WS disp | 3.4 | 2.3 | 2.0 | 3.3 | 5.9 | 4.8 | 7.1 | 6.2 |
| CB disp | 1.1 | 0.7 | 0.5 | 0 | 0.7 | 0.4 | 0.6 | 0.2 |

The invention claimed is:

1. A process for producing polyethylene compositions comprising producing polyethylene resins in a cascaded multi-stage reaction in which the reaction steps are performed in at least two slurry phase polymerization reactors (A) and (B) and at least one gas phase polymerization reactor (C) which are arranged in series in any order wherein in reactor (A) a low molecular weight ethylene homo- or copolymer fraction having a MFR$_2$ of 100 to 2000 g/10 min, in reactor (B) a low molecular weight ethylene homo- or copolymer fraction having an MFR$_2$ of 100 to 2000 g/10 min, and in reactor (C) a high molecular weight ethylene copolymer fraction are produced, and further comprising a compounding step after polymerisation, wherein the final polyethylene composition has a MFR$_{21}$ of 3 to 50 g/10 min, the melt flow rates being determined according to ISO 1133.

2. The process according to claim 1 wherein the polymerisation in at least one of slurry phase polymerization reactors (A) and (B) is carried out in the presence of an inert hydrocarbon medium is selected from the group comprising C$_3$ to C$_8$ hydrocarbons.

3. The process according to claim 1 wherein the polymerisation in at least one of slurry polymerization reactors (A) or (B) is carried out under supercritical conditions whereby the reaction temperature and reaction pressure are above respective critical points of the mixture formed by the hydrocarbon medium, monomer, hydrogen and optional comonomer and the polymerisation temperature is lower than the melting temperature of the polymer formed.

4. The process according to claim 1 wherein in reactor (A) an ethylene homo- or copolymer fraction in an amount of 10 to 30 wt % of the total polyethylene resin is produced.

5. The process according claim 1 to wherein in reactor (A) an ethylene homopolymer fraction is produced.

6. The process according to claim 1 wherein in reactor (B) an ethylene homo- or copolymer fraction in an amount of 15 to 40 wt % of the total polyethylene resin is produced.

7. The process according to claim 1 wherein in reactor (B) an ethylene homopolymer fraction is produced.

8. The process according to claim 1 wherein one or more comonomers selected from the group comprising C$_4$ to C$_8$ alpha-olefins are fed to the reaction mixture in reactor (C).

9. The process according to claim 8 wherein the comonomer is 1-hexene.

10. The process according to claim 1 wherein in reactor (C) an ethylene copolymer fraction in an amount of 30 to 75 wt % of the total polyethylene resin is produced.

11. The process according to claim 1 wherein the polymerisation conditions in reactor (C) are selected as such that the final polyethylene composition has a MFR$_5$ of 0.05 to 2 g/10 min, determined according to ISO 1133.

12. The process according to claim 1 wherein the polymerisation is carried out in the presence of a Ziegler-Natta catalyst.

13. A multimodal polymer composition comprising a polyethylene resin comprising
(i) a first low molecular weight ethylene homo- or copolymer fraction having a MFR$_2$ of 100 to 2000 g/10 min,
(ii) a second low molecular weight ethylene homo- or copolymer fraction having a MFR$_2$ of 100 to 2000 g/10 min, and
(iii) a high molecular weight ethylene copolymer fraction, wherein the polyethylene resin has a MFR$_{21}$ of 3 to 50 g/10 min and white spots are dispersed within the final composition with a white spot dispersion of less than 4.5 after a single compounding step, the melt flow rates being determined according to ISO 1133 and the white spot test according to ISO 18553.

14. The polymer composition according to claim 13 wherein polyethylene fraction (i) is present in an amount of 10 to 30 wt %, polyethylene fraction (ii) is present in an amount of 15 to 45 wt %, and polyethylene fraction (iii) is present in an amount of 30 to 75 wt %, based on the total amount of the polyethylene resin.

15. The multimodal polymer composition according to claim 13 wherein combined polyethylene fractions (i) and (ii) are present in an amount of at least 53 wt % of the total polyethylene resin.

16. The multimodal polymer composition according to claim 13 wherein at least one of polyethylene fractions (i) or (ii) is an ethylene homopolymer and polyethylene fraction (iii) is an ethylene copolymer having comonomer units selected from comprising C$_4$ to C$_8$ alpha-olefins.

* * * * *